(12) United States Patent
Kirst

(10) Patent No.: US 7,398,188 B2
(45) Date of Patent: Jul. 8, 2008

(54) APPARATUS FOR DETERMINING AND/OR MONITORING A PHYSICAL OR CHEMICAL QUANTITY

(75) Inventor: Michael Kirst, Freiburg (DE)

(73) Assignee: Endress + Hauser (Deutschland) AG + Co. KG, Weil am Rhein (DE)

(*) Notice: Subject to any disclaimer, the term of this patent is extended or adjusted under 35 U.S.C. 154(b) by 0 days.

(21) Appl. No.: 10/523,928

(22) PCT Filed: Jul. 30, 2003

(86) PCT No.: PCT/EP03/08425

§ 371 (c)(1),
(2), (4) Date: Oct. 17, 2005

(87) PCT Pub. No.: WO2004/015646

PCT Pub. Date: Feb. 19, 2004

(65) Prior Publication Data

US 2006/0122811 A1    Jun. 8, 2006

(30) Foreign Application Priority Data

Aug. 7, 2002    (DE) ............................. 102 36 226

(51) Int. Cl.
*G06F 15/00*    (2006.01)

(52) U.S. Cl. ..................................................... 702/188
(58) Field of Classification Search ................. 702/188, 702/62, 122; 340/3.1; 700/9
See application file for complete search history.

(56) References Cited

U.S. PATENT DOCUMENTS

| 6,615,656 B1 * | 9/2003 | Breed et al. ............... 73/290 R |
| 2002/0036430 A1 * | 3/2002 | Welches et al. ............... 307/18 |
| 2004/0086768 A1 * | 5/2004 | Fleckner et al. ............... 429/38 |

OTHER PUBLICATIONS http://www.m-w.com/dictionary/hydrogen, p. 1.*

* cited by examiner

*Primary Examiner*—Tung S Lau
(74) *Attorney, Agent, or Firm*—Bacon & Thomas, PLLC

(57) ABSTRACT

An apparatus for determining and/or monitoring a physical or chemical quantity during a process. The apparatus comprises at least one field device which exchanges data with a remote monitoring station by means of a data connection. The apparatus is provided with at least one fuel cell which is electrically connected to the field device, but arranged at a distance from the field device, and at least partially covers the energy demand of the field device.

23 Claims, 2 Drawing Sheets

APPARATUS FOR DETERMINING AND/OR MONITORING A PHYSICAL OR CHEMICAL QUANTITY

FIELD OF THE INVENTION

The invention relates to an apparatus for determining and/or monitoring a physical or chemical variable in a process. The apparatus comprises at least one field device.

BACKGROUND OF THE INVENTION

For determining physical or chemical process variables, such as e.g. a fill level in a container, a volume, or mass, flow rate through a section of pipeline, a pressure in a line or container, a temperature of a medium, etc., a variety of types of sensors are used, which naturally are based on many different physical measuring principles.

Thus, for example, the fill level of a fill substance in a container is usually obtained via the transit time of ultrasonic waves or electromagnetic waves, particularly microwaves, which are reflected on the surface of the fill substance. When microwaves are used, these are radiated either freely into the container in the direction of the surface of the fill substance, or the microwaves are guided along a conductive element in the container. Furthermore, capacitive and radiometric measuring methods are also often used for fill level measurement.

For limit level detection, preferably the resonance frequency of an oscillating tine, or of an oscillatable structure composed of multiple oscillating tines, is evaluated. In this measuring method, the effect is utilized in which the resonance frequency differs depending on whether the oscillating tine executes its oscillations freely or, instead, in contact with the fill substance.

However differently the individual measuring apparatuses for determining the fill level or other physical variable, for example flow rate, may be constructed, one thing is common to all—they require energy. This energy is normally supplied via electrical lines.

The disadvantage of known measuring apparatuses of the type described is, among other things, that until now the energy is normally supplied from a remote, e.g. grid-fed power source, via an appropriate field bus system, with the supplied energy needing to be re-formed multiple times, e.g. with respect to the voltage level. Furthermore, the wiring required for supplying the energy usually necessitates relatively high installation costs, with the cable alone possibly incurring considerable expenses.

In DE 100 37 911 A1, DE 201 07 117 U1, or also DE 199 29 343, apparatuses for determining and/or monitoring a physical or chemical variable have already been proposed, which apparatuses seek to resolve the above-named disadvantages. Each of the apparatuses includes a sensor part, an electronics part, and a housing. At least the electronics part is arranged in the housing.

Furthermore, at least one fuel cell, e.g. to be fueled with hydrogen as the fuel, is provided, through which the energy, or, stated alternatively, power, requirement of the apparatus is at least partially satisfied. As a result of this embodiment, a measuring device supplied with energy directly in the field is provided, which can be placed at any location in the process, and there, if necessary, can be operated completely self-sufficiently, that is, without an external energy supply.

However, found to be problems in the case of these solutions are: The currently possibly inadequate ability of such fuel cells to supply power (especially a still unsatisfactory power-to-weight ratio); and, above all, the very complex and, in areas where there is danger of explosion, even critical replenishing of the often highly explosive fuel into the fuel cells of the individual field devices. Furthermore, the power output of such fuel cells is affected to no small degree by the climatic conditions of the space where they are installed, however especially also by the surrounding temperature.

SUMMARY OF THE INVENTION

An object of the invention is to provide an apparatus powered by at least one fuel cell, which apparatus is easily accessible for refueling, and which permits usage of the field device supplied by it in Ex-zones.

his object is achieved by an apparatus, which has the following features:
 the field device exchanges data with a remote control station via a data connection;
 at least one fuel cell, electrically connected with the field device, covers the energy requirement of the field device at least partially;
 the fuel cell is arranged remotely from the field device.

Depending on the application, multiple fuel cells are combined into a fuel cell package. If the field devices are arranged in a zone where there is danger of explosion, then the fuel cells can supply the field devices with energy from a remote, safe location. Furthermore, this remote-arrangement allows for the possible fueling of the at least one fuel cell to be accomplished completely without danger. Since the at least one fuel cell, or the fuel cell package, can simultaneously supply multiple field devices with energy, the refueling is greatly simplified, because it is carried out at only one, central location.

In accordance with a further development of the apparatus of the invention, the data connection between the control station and the at least one field device is executed wirelessly, or via a data line. Preferably the data line and the energy supply line are the same line. The data line can be a field bus or a two-wire line. The remotely arranged fuel cell, or fuel cell package, feeds the energy into the field bus, or the two wire line, and thus guarantees the energy supply of all the field devices connected to the bus or to the two-wire line. Preferably the at least one fuel cell is arranged in the control station or in the control room.

An advantageous further development of the apparatus of the invention provides that the at least one field device is at least temporarily connected with a first fuel cell and with a second fuel cell. Depending on the energy requirement, the field device, respectively the field bus or the connection line, is at least temporarily connected with only one of the two fuel cells. Through this, it is possible to decouple a fuel cell from the field bus or connection line during the replenishment without the functional efficiency of the field devices being impaired in any way.

In many applications, the field devices are positioned in an area where there is danger of explosion. Thus, in the case of the known solutions, the replenishment of fuel is problematic, or impossible, since this would constitute a violation of prevailing safety regulations. Because, in accordance with the invention, the replenishment of the fuel can be accomplished from any remote location, a field device, or field bus connected to field devices, can be positioned in any Ex-zone.

An advantageous further development of the apparatus of the invention provides a monitoring unit, which issues a warning/error report as soon as the energy supplied by the at least one fuel cell falls below a predetermined limit value. Through this, a continuous operation of the fuel cell, and of the at least one field device, is guaranteed, since a replenishment occurs before the energy supply is interrupted. In addition, a fueling unit is provided, by way of which the fuel cell can be fueled. In the simplest case, the fueling unit is a syringe.

Furthermore, the apparatus of the invention can also be advantageously developed, such that the field bus system, with the field devices connected to it, if necessary, can be operated completely self-sufficiently, that is, without a grid-fed energy supply, especially also when communication with the superordinated units is accomplished wirelessly.

BRIEF DESCRIPTION OF THE DRAWINGS

The invention will now be explained in greater detail on the basis of the drawings, whose figures show as follows.

DESCRIPTION OF THE PREFERRED EMBODIMENTS

Figure 1:
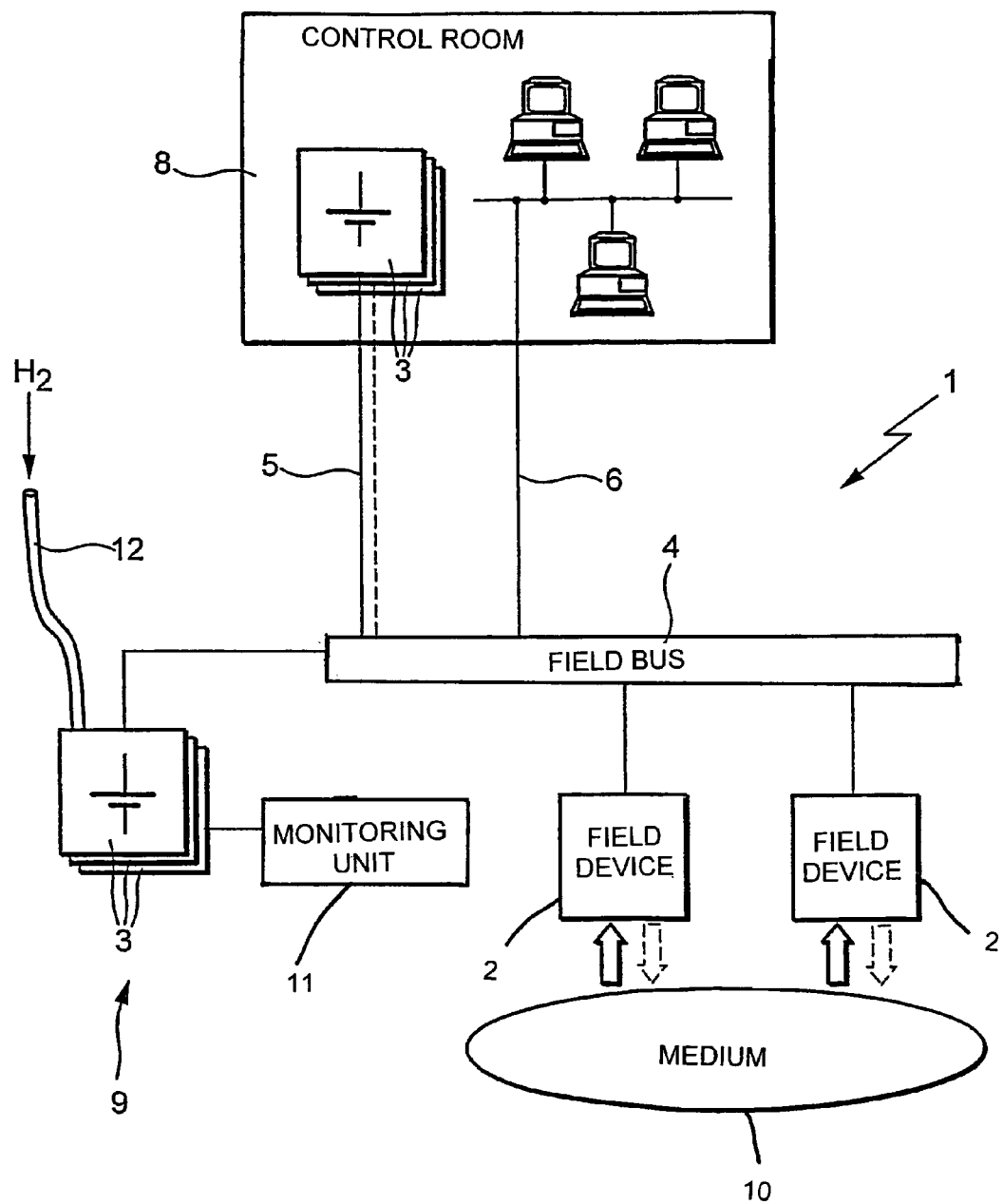
FIG. 1 a schematic illustration of a first form of embodiment of the apparatus of the invention.
Figure 2:
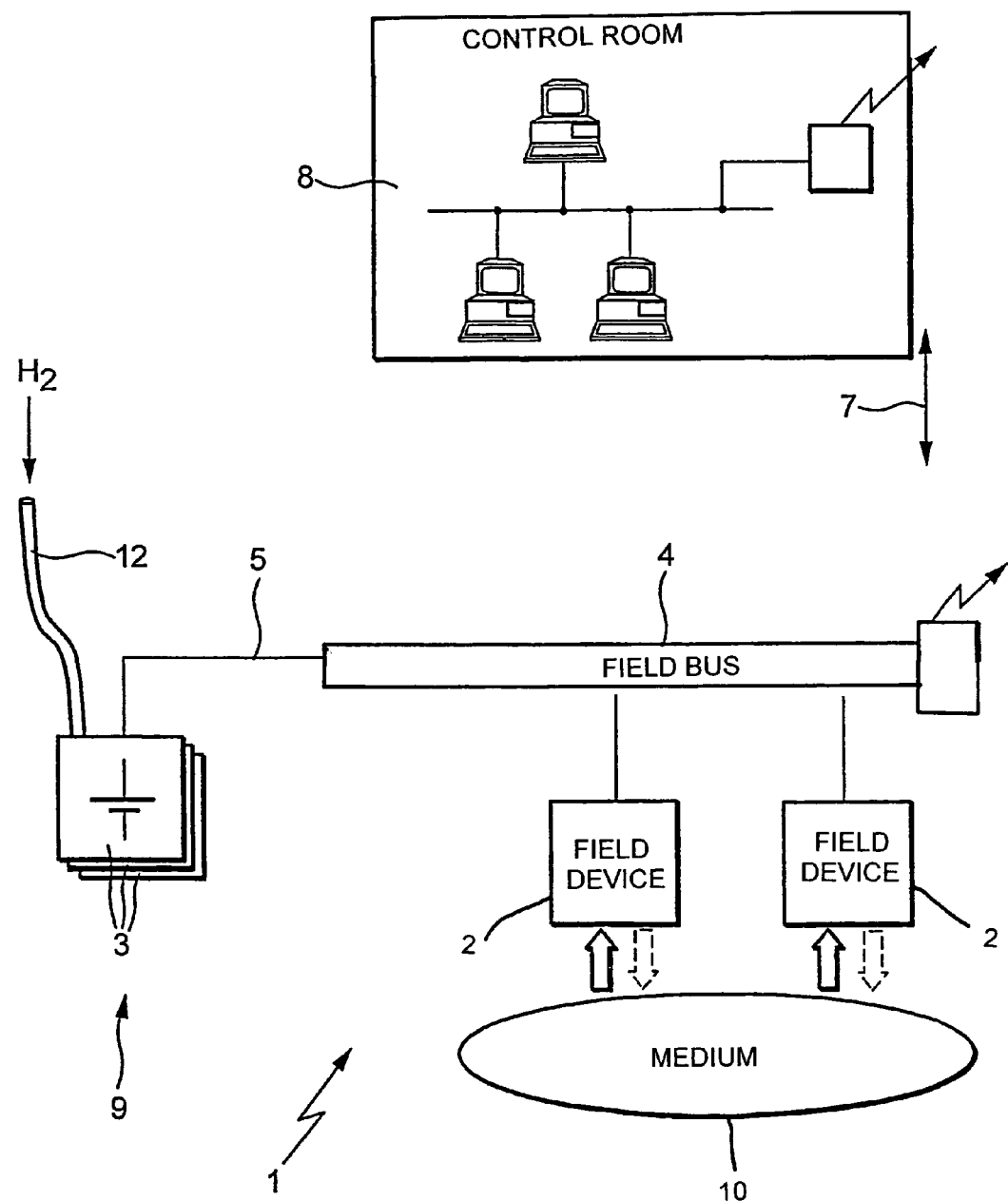
FIG. 2 a schematic illustration of a second form of embodiment of the apparatus of the invention.

FIG. 1 shows a schematic illustration of a first form of embodiment of the apparatus of the invention 1; in FIG. 2, a second form of embodiment is shown.

Multiple field devices 2 are connected to a field bus 4. The field devices 2 determine one or more measurement variables of the medium 10 being measured. The field devices 2 communicate with one another via a data line 4, for example via a field bus 4 or a two-wire line. In the example of embodiment shown in FIG. 1, communication with the remotely arranged control station 8 is accomplished via the data line 6; in the example of an embodiment shown in FIG. 2, communication is accomplished via a wireless connection 7, per radio.

The field bus 4, with the field devices 2, is supplied with the required energy by a fuel cell package 9, which is composed of individual, interconnected fuel cells 3. In such instance, e.g. liquid hydrogen can serve as the fuel.

If the field devices 2 are arranged in a zone where there is danger of explosion, then the fuel cell package 9 preferably is arranged in a safe area, e.g. in the control room 8. Otherwise, the feed of energy into the field bus 4, or into the two-wire line, can be accomplished from any location. The advantage of this embodiment is that the possible replenishment of fuel into the fuel cells 3 can be carried out at a central location. This central location can be located in e.g. the control room, or, however, also near the process.

Thus, in contrast to the state of the art referenced earlier, it is no longer necessary to separately replenish the fuel cells 3 of any field device 2. Rather, the fuel cell package 9, or the at least one fuel cell 3, is connected to the field bus at an appropriate location via an electric connection line; thus, the energy for supplying the field devices 2 is made available to the field devices via the field bus 4, or the two-wire line. For the reasons already named, the fuel cells 3, or the at least one fuel cell 3, are arranged in an explosion-protected zone, and the energy supply to the field bus 4 is accomplished using the connection line 5.

The monitoring unit 11 monitors the supply of fuel in the fuel cell package 9, and signals to the operator when the fuel supply falls beneath a predetermined minimum limit value. The replenishing of fuel into the fuel cells 3, or into the fuel cell package 9, is accomplished by means of the fueling unit 12. In this way, a continuous operation of all field devices 2 connected to the connection line 4 is guaranteed.

The invention claimed is:

1. An apparatus for determining and/or monitoring a physical or chemical variable in a process, comprising:
   a remote control station;
   data connection;
   at least one field device with a sensor for determining at least one physical process variable, said at least one field device exchanges data with said remote control station via said data connection; and
   at least one fuel cell arranged at a remote location from said at least one field device and electrically connected with said at least one field device via said data connection,
   wherein:
   said at least one fuel cell at least partially covers the energy requirement of said at least one field device; and
   replenishment of said at least one fuel cell occurs at said remote location.

2. The apparatus as claimed in claim 1, wherein:
   said data connection between the control station and said at least one field device is accomplished wirelessly.

3. The apparatus as claimed in claim 1, wherein:
   multiple field devices are provided, which are electrically connected with said at least one fuel cell.

4. The apparatus as claimed in claim 1, wherein:
   said at least one fuel cell is arranged in said control station.

5. The apparatus as claimed in claim 1, wherein:
   a first fuel cell and a second fuel cell are provided, and said at least one field device is connected, at least at times, with said first fuel cell and said second fuel cell.

6. The apparatus as claimed in claim 1, wherein:
   multiple fuel cells are combined into a fuel cell package.

7. The apparatus as claimed in claim 1, wherein:
   said at least one field device is positioned in an area where there is danger of explosion.

8. The apparatus as claimed in claim 1, further comprising:
   a monitoring unit, which issues a warning/error report as soon as the energy supplied by said at least one fuel cell falls beneath a predetermined limit value.

9. The apparatus as claimed in claim 1, further comprising:
   a fueling unit, via which said at least one fuel cell can be fueled.

10. The apparatus as claimed in claim 1, wherein:
    said data connection between the control station and said at least one field device is accomplished via a data line.

11. The apparatus as claimed in claim 1, wherein:
    said at least one fuel cell is arranged in an explosion-protected zone.

12. The apparatus as claimed in claim 1, further comprising:
    a monitoring unit for said fuel cell, said monitoring unit signalling when a fuel supply of said fuel cell falls beneath a predetermined limit value.

13. The apparatus as claimed in claim 1, wherein: apparatuses for limit level detection, measuring apparatuses for determining a flow rate, measuring apparatuses for determining a pressure in a line, measuring apparatuses for determining a pressure in a container, and measuring apparatuses for determining a temperature of a medium.

14. The apparatus as claimed in claim 1, wherein:
    said at least one field device uses ultrasonic waves for determining a fill level of fill substance in a container.

15. The apparatus as claimed in claim 1, wherein:
    said at least one field device uses electromagnetic waves for determining a fill level of fill substance in a container.

16. The apparatus as claimed in claim 2, wherein:
    said data connection includes a field bus.

17. The apparatus as claimed in claim 2, wherein:
said data connection includes a two-wire line.
18. The apparatus as claimed in claim 16, wherein:
said at least one fuel cell is connected with field bus via a connection line.
19. The apparatus as claimed in claim 5, wherein:
said at least one field device is connected, at least at times, with only one of the two fuel cells.
20. The apparatus as claimed in claim 7, wherein:
said fuel cell supply the field device with energy from a remote, safe location.

21. The apparatus as claimed in claim 16, wherein:
said at least one fuel cell is connected with said at least one field device via said field bus.
22. The apparatus as claimed in claim 17, wherein:
said at least one fuel cell is connected with said at least one field device via said two-wire line.
23. The apparatus as claimed in claim 18, wherein:
energy is supplied from said at least one fuel cell to the field bus via a connection line.

* * * * *